(12) United States Patent
Gadeyne et al.

(10) Patent No.: US 6,909,472 B2
(45) Date of Patent: Jun. 21, 2005

(54) CONVERSION OF A VIDEO SIGNAL FOR DRIVING A LIQUID CRYSTAL DISPLAY

(75) Inventors: Koen Gadeyne, Anzegem (BE); Patrick Vandenberghe, Hareelbeke (BE)

(73) Assignee: Barco N.V., Poperinge (BE)

( * ) Notice: Subject to any disclaimer, the term of this patent is extended or adjusted under 35 U.S.C. 154(b) by 0 days.

(21) Appl. No.: 10/061,185

(22) Filed: Feb. 4, 2002

(65) Prior Publication Data

US 2002/0097345 A1 Jul. 25, 2002

Related U.S. Application Data

(63) Continuation of application No. 09/459,853, filed on Dec. 14, 1999, which is a continuation of application No. PCT/EP99/02050, filed on Mar. 25, 1999.

(30) Foreign Application Priority Data

Apr. 17, 1998 (EP) .............................................. 98870086

(51) Int. Cl.$^7$ ................................................. H04N 3/14
(52) U.S. Cl. .......................... 348/790; 348/674; 345/87
(58) Field of Search .............................. 348/790, 791, 348/792, 793, 674, 675, 613, 616, 625; 345/63, 87, 89, 904, 95; H04N 3/14

(56) References Cited

U.S. PATENT DOCUMENTS

| | | | |
|---|---|---|---|
| 3,643,011 A | * | 2/1972 | Engel et al. ................ 348/625 |
| 4,855,831 A | | 8/1989 | Miyamoto et al. |
| 4,888,529 A | | 12/1989 | Madsen et al. |
| 4,910,598 A | | 3/1990 | Itakura et al. |
| 5,396,157 A | | 3/1995 | Hackett et al. |
| 5,416,599 A | * | 5/1995 | Ubukata et al. ............. 386/13 |
| 5,438,342 A | | 8/1995 | Yamaguchi ................... 345/58 |
| 5,526,129 A | * | 6/1996 | Ko .............................. 348/708 |
| 5,592,190 A | | 1/1997 | Okada et al. ................. 345/89 |
| 5,619,224 A | | 4/1997 | Hoshino et al. .............. 345/98 |
| 5,619,349 A | | 4/1997 | Ueda et al. |
| 5,627,555 A | | 5/1997 | den Hollander |
| 5,936,621 A | | 8/1999 | Medin et al. |

FOREIGN PATENT DOCUMENTS

| | | |
|---|---|---|
| EP | 0 300 754 | 1/1989 |
| EP | 0 487 140 A1 | 11/1990 |
| EP | 0 553 865 A2 | 8/1993 |
| EP | 0 603 713 A1 | 6/1994 |
| EP | 0 608 056 A1 | 7/1994 |
| GB | 2 191 667 | 12/1987 |
| JP | 04-288589 A | 10/1992 |
| WO | WO 94/09475 | 4/1994 |
| WO | WO 94/23532 | 10/1994 |
| WO | WO 97/12355 | 4/1997 |
| WO | WO 97/33271 | 9/1997 |

OTHER PUBLICATIONS

Okumura et al., "32.3: A New Low–Image–Lag Drive Method for Large–Size LCTVs," SID 92 Digest, Toshiba R & D Center (Kawasaki, Japan), p. 601–604, (1992).

(Continued)

*Primary Examiner*—John Miller
*Assistant Examiner*—Trang U. Tran
(74) *Attorney, Agent, or Firm*—Pillsbury Winthrop LLP

(57) ABSTRACT

Method and apparatus for the conversion or generation of a video signal intended to be displayed on an image display with different luminance response times for rise and fall. The conversion or generation of the video signal is so that motion artefacts which are caused by the difference in luminance response times for rise and fall such as large area luminance jumps, large-area flicker and faulty temporary large-area luminance are fundamentally cancelled in the displayed image.

20 Claims, 7 Drawing Sheets

OTHER PUBLICATIONS

McCartney et al., "The Primary Flight Instruments for the Boeing 777 Airplane," 98/SPIE vol. 2219, Honeywell, Inc. (Phoenix, Arizona), p. 98–107, (1994).

Haim et al., "A2.2: Full–Color Gray–Scale LCD with Wide Viewing Angle for Avionics Applications.," SID 94 Applications Digest, Honeywell, Inc. (Phoenix, Arizona), p. 23–26, (1994).

McCartney et al., "Performance Testing of the Primary Flight Instruments for the Boeing 777 Airplane," 86/SPIE vol. 2734, Honeywell, Inc. (Phoenix, Arizona), p. 86–93, (1996).

Schönfelder, H., "Digitale Filter in der Videotechnik", pp. (besides front 3) 10, 79–82, 113–115, 125–128, 204–206, 208–209, 212 and 213. Published by Drei–R–Verlag, Berlin, Germany (1988). See IDS filed Feb. 10, 2003.

* cited by examiner

Fig. X14b   PRIOR ART

CONVERSION OF A VIDEO SIGNAL FOR DRIVING A LIQUID CRYSTAL DISPLAY

CROSS REFERENCE TO RELATED APPLICATIONS

This application is a continuation of application Ser. No. 09/459,853 filed Dec. 14, 1999 which was a continuation of International Application No. PCT/EP99/02050 filed Mar. 25, 1999, both of which claim priority from European Application No. 98870086.0 filed Apr. 17, 1998, the contents of all three applications being incorporated hereinto by this reference thereto.

FIELD OF THE INVENTION

The present invention relates to the display of images on image displays with different luminance rise and fall response times, such as liquid crystal displays, in particular to the display of TV pictures and/or data information on a video display system equipped with a liquid crystal display device.

DESCRIPTION OF RELATED ART

The display of video images on display devices such as a Cathode Ray Tube (CRT) or a Liquid Crystal Display (LCD) is a known art. Image displays equipped with such CRT or LCD display devices are capable of displaying on a display screen images consisting of a number of picture elements (or pixels) which are refreshed at a refresh rate generally above 25 Hz. These images may be monochromatic, multicolor or full-color. Common standards are in use to display the images as a succession of frames.

The light of the successive frames which are displayed on the display screen of such a CRT or LCD display device is integrated by the human eye. If the number of displayed frames per second—further called the frame rate—is sufficiently high, an illusion of the images being displayed in a continuous way, and therefore an illusion of motion, can be created.

The way images are formed on the display screen of a CRT display device is fundamentally different from the way images are formed on the display screen of an LCD display device.

On a CRT display device, the luminance of a picture element is produced by an area of a phosphor layer in the display screen when the area is hit by a writing electron beam.

On an LCD display device, the luminance of a picture element is determined by the light transmittance state of one or more liquid crystal elements in the display screen of the LCD display device at the location of the picture element, whereby the light itself originates from ambient light or a light source.

For a faithful reproduction of moving images or moving parts of an image, the luminance response of the display device being used is of utmost importance.

The luminance responses and the luminance response times of display screens are known to be very different for CRT and LCD display devices. The luminance response time, being the time needed to reach the correct luminance on the display screen in response to an immediate change in a corresponding drive signal is shorter than a frame period for a CRT display device but up to several frame periods for a typical LCD display device according to the state of the art.

For LCD display devices, the luminance responses and luminance response times are also known to be different for a darker-to-brighter luminance transition as compared to the responses and response times for a similar brighter-to-darker luminance transition. Furthermore, the luminance responses and luminance response times are temperature dependent, drive voltage range dependent and, due to production tolerances, unequal over the LCD screen area (location dependent).

Various solutions are known for changing luminance response times with LCD display devices. They however have the aim to shorten the overall luminance response times, not to make the luminance rise and fall times equal. EP 0 487 140 discloses a method for speeding up display response times by doubling the display frame rate. The luminance rise and fall times remain different. EP 0 553 865 describes luminance flicker phenomena related to luminance response, but these phenomena are not due to the difference between luminance rise and fall times, but rather to how image lines are written.

There exist a number of images, further referred to as specific images, which when moved over a display screen with different luminance rise and fall times, give rise to visible and measurable artefacts in the displayed image, even when the luminance responses are shortened.

It is characteristic of such specific images that they contain a number of isolated or clustered picture points, which are in high contrast to their surroundings in the image.

The artefacts are due to the difference between luminance rise and fall times, which is typical for an LCD display device. This causes the luminance fall (or rise) of a white spot at a first location to be different from the simultaneous luminance rise (or fall) of a white spot at a second location, when the white spot is moved from the first to the second location. The total luminance integrated over the screen area immediately before, during and after the movement of the white point is not constant. The integrated luminance shows a "luminance jump".

In practice, the artefacts will only be visible when more picture elements change luminance at the same time within the observation field of the viewer.

In practice, various different artefacts may appear dependent on various parameters such as the difference between luminance rise and fall times, the frame rate of the displayed image, the video signal levels, the speed with which the image is moved over the screen, the image content.

The visible artefacts cause the quality of the displayed image to range from being inferior to unacceptable. The known solutions of increasing the frame rate do not fundamentally solve the problems but only make them in the best case less perceptible.

SUMMARY OF THE INVENTION

It is the aim of this present invention to remove luminance jumps and visible artefacts resulting from luminance jumps in a displayed image during and immediately after the movement of the image, the luminance jumps and the artefacts being caused by a difference in luminance rise and fall times of the display screen on which the image is displayed.

This is obtained by a method for converting a first video signal into a second video signal, the second video signal being intended for being displayed on a display device with different luminance rise and fall times, which comprises a display screen, and which operates at a frame period. The conversion is so that the second video signal causes the luminance time response of a picture element of the image to a change of the first video signal from a first amplitude value to a second amplitude value to be substantially equal in shape and amplitude but reversed (i.e., inverted) in slope compared to the luminance time response of the same or another picture element of the image to a change of the first video signal from the second amplitude value to the first amplitude value. The luminance time responses can be made substantially equal to predefined luminance time responses.

The luminance time responses can be made substantially equal in amplitude and not slower than the luminance response of the same or another picture element which would be caused by the first video signal if this were displayed without conversion. The choice of the same or another picture element can be the same picture element itself, a reference picture element from a selected group of picture elements (e.g. a window) to which the same picture element belongs, any picture element which can be displayed on the display screen of the display device. The chosen same or another picture element can be that picture element of all picture elements which are aimed to be displayed of which the luminance response is the slowest. The conversion permits the compensation of the unevenness of the luminance rise and fall times over the surface of the display screen, as well as the compensation of the temperature dependency of the luminance rise and fall times.

According to a preferred embodiment, the conversion is such that the second video signal is built up in real time in consecutive steps during corresponding consecutive correction periods.

For the determination of a next step, one or more of the following parameters may be taken into account at the start of a correction period:

the present luminance of the picture element as predicted at the instant of the previous correction period, the present amplitude of the first video signal, the physical location of the picture element on the display screen, the present temperature at the location of the picture element.

Preferably, a correction period is equal to a multiple of the frame period of the second video signal.

Preferably, the frame rate of the second video signal is a multiple of the frame rate of the first video signal.

According to an embodiment of the present invention, the conversion of the first video signal into the second video signal is so that the faster luminance response of a picture element to a change of the first video signal is slowed down in order to match the luminance response in time and amplitude to the known slower luminance response of the same or another picture element for the opposite change of the first video signal.

According to another embodiment of the present invention, the conversion of the first video signal to the second video signal is so that the slower luminance response of a picture element to a change of the first video signal is accelerated in order to match the luminance response in time and amplitude to the known faster luminance response of the same or another picture element for the opposite change of the first video signal.

According to another embodiment of the present invention, the conversion of the first video signal to the second video signal is so that the second video signal causes the luminance time response of a picture element to a change of the first video signal from a first amplitude value to a second amplitude value to be substantially equal in shape and amplitude but inverted in slope compared to the luminance time response of the same or another picture element for a change of the first video signal from the second amplitude value to the said first amplitude level, the luminance responses being equal to predefined luminance responses.

Furthermore, an apparatus is disclosed and claimed for carrying out a method as described herein.

BRIEF DESCRIPTION OF THE DRAWINGS

FIG. 14b shows a waveform of a prior art RMS drive voltage to an individual liquid crystal cell in an LCD display screen to let it change luminance first from black to white and later from white to black;

DETAILED DESCRIPTION OF THE INVENTION

Figure 1A:
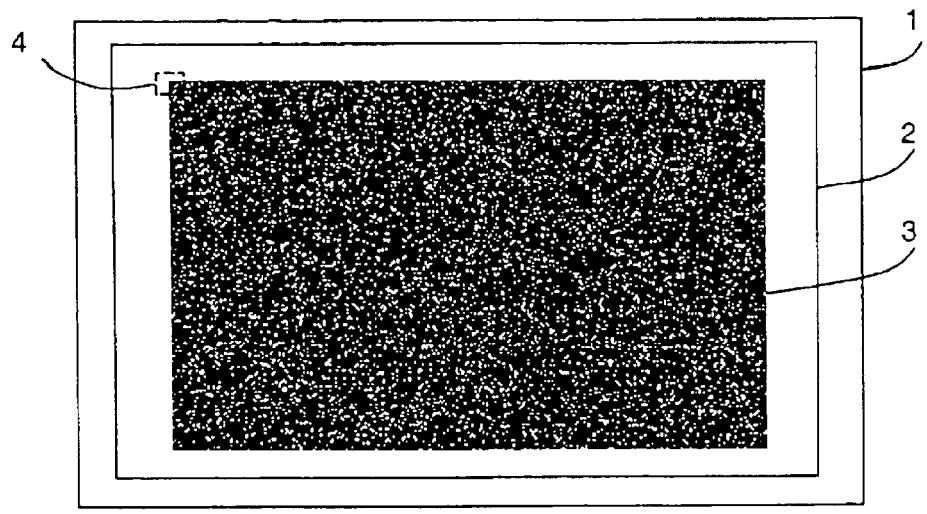
FIGS. 1a, 1b and 1c illustrate the display of a specific video signal and its scrolling down over the display screen.
Figure 1B:
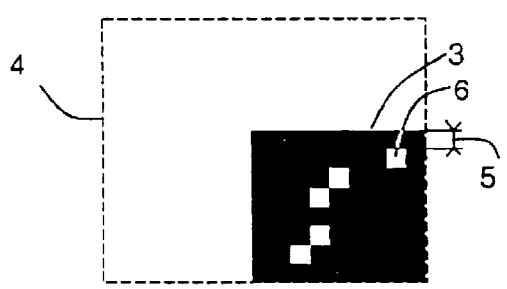
Figure 1C:
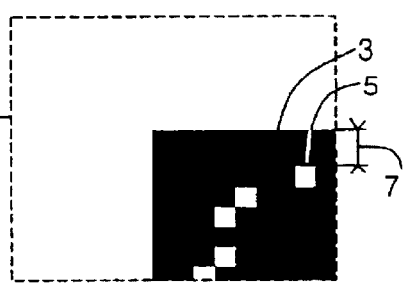

A first example of a specific image is illustrated in FIG. 1a, FIG. 1b and FIG. 1c. An image display 1 has on its display screen 2 a specific image 3 characterized by a high noise content, the image scrolling down at such a slow speed that the scrolling steps are individually perceptible. FIG. 1b shows an enlarged part 4 of the specific image 3, its location referred to the image being shown in FIG. 1a. FIG. 1b and FIG. 1c illustrate a downward scrolling step equal to the difference between the distance 5 of a bright image point 6 to the top border of the image before a scrolling step and the distance 7 after the scrolling step.

Figure 2:
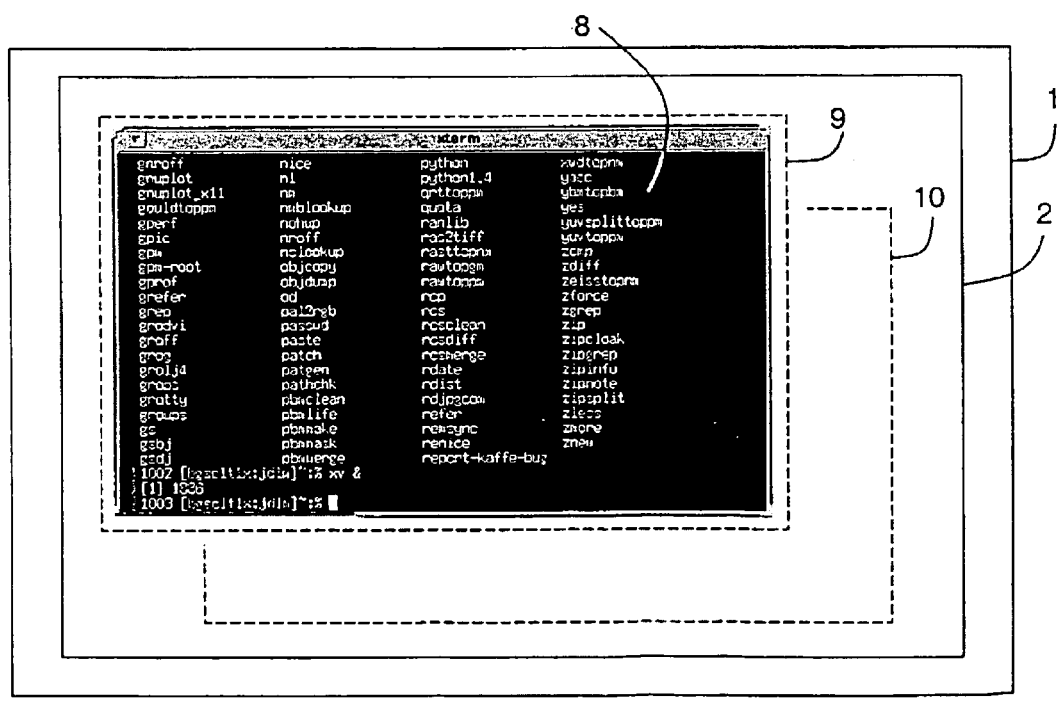
FIG. 2 illustrates the display of a specific "text window" video signal and its movement over the display screen.

A second example of a specific image is illustrated in FIG. 2 and shows a window 8 with text inside, which is moved over a display screen 2 from a location 9 to a location 10. Depending on the luminance rise and fall responses of the display device and on the scrolling or movement speed, artefacts are seen as a large-area luminance flash, large-area luminance flicker, or a temporary faulty large-area luminance.

Figure 3A:
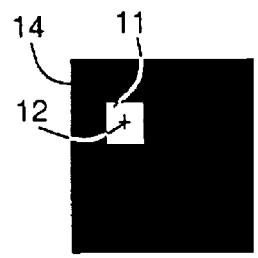
FIGS. 3a, 3b, and 3c illustrate the movement of a white point between a first location and a second location on a display screen.
Figure 3B:
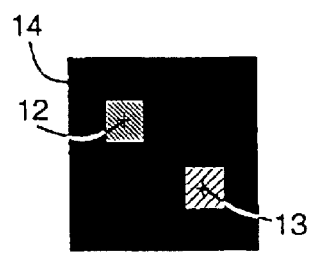
Figure 3C:
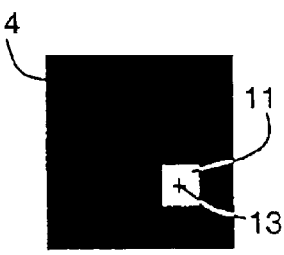

FIGS. 3a, 3b and 3c illustrate the movement on a display screen of a white point 11 with the dimension of a picture element from a first position 12 (FIG. 3a) to a second position 13 (FIG. 3c). Only a small part 14 of the display screen enclosing the two locations 12 and 13 is shown in an enlarged way.

When the white point changes instantly from the first position 12 to the said second position 13, the following happens.

On a display screen of which the luminance response is immediate, the white point will at the same instant fully disappear at the first location 12 and fully reappear at the second location 13; the luminance integrated over the screen area 14 at time instances before, during and after the move of the white point will be equal to the luminance corresponding to one white point.

On a display screen with a luminance rise time different compared to the luminance fall time as it is typical for an LCD display device, the luminance fall (or rise) of the white spot at the first location 12 will be different from the simultaneous luminance rise (or fall) of the white spot at the same instant at the second location 13; the total luminance integrated over the screen area 14 is not equal immediately before, during and after the movement of the white point.

Figure 4:
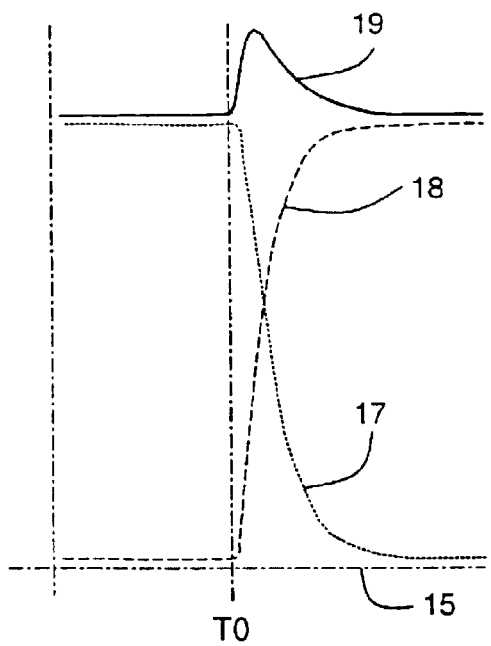
FIG. 4 shows luminance responses on a display screen of which the luminance rise time is shorter than the luminance fall time, when a white point moves from a first to a second location (prior art)

FIG. 4 shows the luminance before, during and after the movement of the white point 11 at a time instant T0 from a first location 12 to a second location 13 on a display screen of which the luminance rise time is shorter than the luminance fall time. The horizontal axis 15 is a time scale and the vertical axis 16 is a luminance scale. Graph 17 shows the luminance of the picture element at the first location 12, graph 18 shows the luminance of the screen picture element at the second location 13, and graph 19 shows the integrated luminance over the screen area 14.

Figure 5:
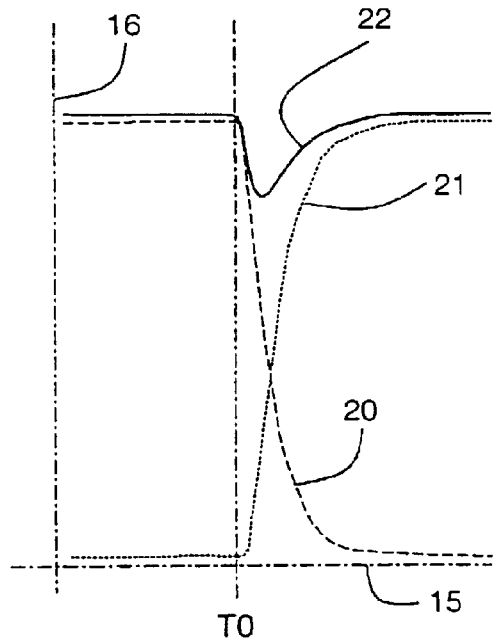
FIG. 5 shows luminance responses on a display screen of which the luminance rise time is longer than the luminance fall time, when a white point moves from a first to a second location (prior art)

FIG. 5 shows the luminance before, during and after the move of the white point 11 at a time instant T0 from a first position 12 to a second position 13 on a display screen of which the luminance rise time is longer than the luminance fall time. Graph 20 shows the luminance of the picture element at the first location 12, graph 21 shows luminance of the picture element at the second location 13, and graph 22 shows the integrated luminance over the screen area 14.

FIGS. 4 and 5 show that when the white point 11 moves from the first position 12 to the second position 13, there is a short luminance jump, upwards or downwards depending on how the rise and fall times of the display screen relate to each other. Within the same time period, the luminance of the picture element at the second location 13 is changed differently compared to the luminance of the picture element at the first location 12, the difference determining the amplitude of the luminance jump. This luminance jump is at the origin of the artefacts mentioned above and further explained below.

If more white points are moved at the same instant and within the same small area of the display screen, a luminance jump will occur as well but its amplitude depends on how the white points are distributed within the same area.

Figure 6A:
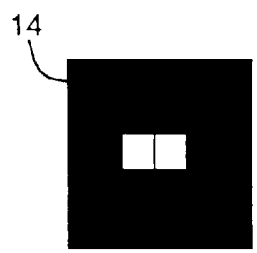
FIGS. 6a, 6b, and 6c illustrate a horizontal movement of two white points on a display screen.
Figure 6B:
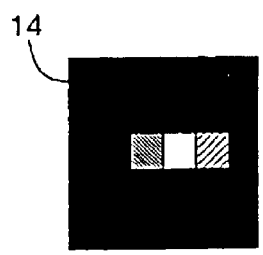
Figure 6C:
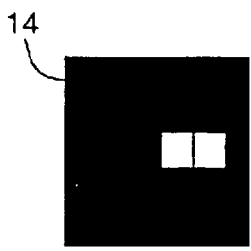

FIGS. 6a, 6b and 6c illustrate how two white points laying side-by-side move in the same horizontal direction over a distance of one picture element. FIG. 6b shows that one picture element does not change luminance, while two other picture elements change luminance. Compared to the move of one white point as described above, the amplitude of the luminance jump within the area 14 is equal; however the relative luminance jump being the absolute luminance jump related to the total luminance of the moving points is smaller.

Figure 7A:
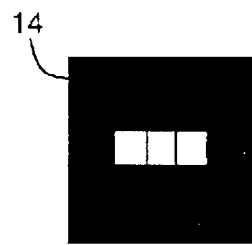
FIGS. 7a, 7b, 7c illustrate a horizontal movement of three white points on a display screen.
Figure 7B:
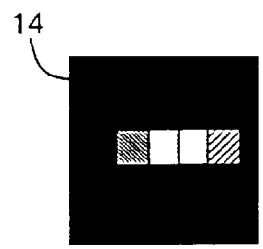
Figure 7C:
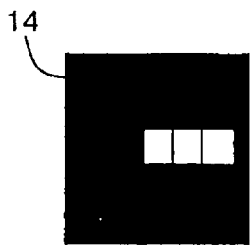

FIG. 7a, FIG. 7b and FIG. 7c illustrate how three white points laying side-by-side move in the same horizontal direction over a distance of one picture element. FIG. 7b shows that two picture elements do not change luminance, while two other picture elements change luminance. Compared to the move of one white point as described above, the amplitude of the luminance jump within the area 14 is equal. Compared to the move of two white points as described above, the amplitude of the luminance jump within the area 14 is equal; however the relative luminance jump being the absolute luminance jump related to the total luminance of the moving points is smaller.

Figure 8A:
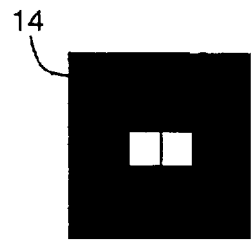
FIGS. 8a, 8b, and 8c illustrate a vertical movement of two white points on a display screen.
Figure 8B:
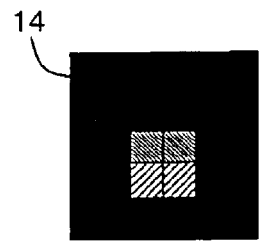
Figure 8C:
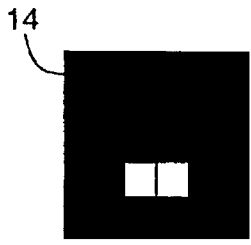

FIGS. 8a, 8b and 8c illustrate how two white points above each other move in the same vertical direction over a distance of one picture element. FIG. 8 shows that four picture elements do change luminance at the same time. Compared to the move of one white point, the luminance jump is doubled, but the relative luminance jump is the same.

Figure 9A:
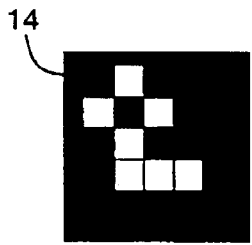
FIGS. 9a, 9b, and 9c illustrate a movement of a cluster of white points on a display screen.
Figure 9B:
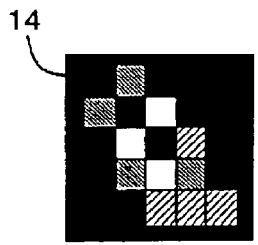
Figure 9C:
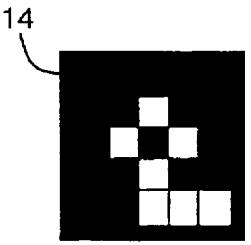

Different combinations of white points moving at the same time in the same direction from one first location to a second location within an area of the image screen will give different absolute and relative luminance jumps within that area. FIGS. 9a, 9b and 9c illustrate a movement of a larger combination or cluster of white points from one location to a more right-down location.

Figure 10:
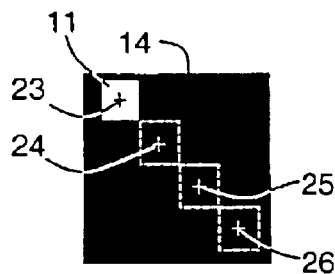
FIG. 10 illustrates a movement in three steps of a white point on a display screen.
Figure 11:
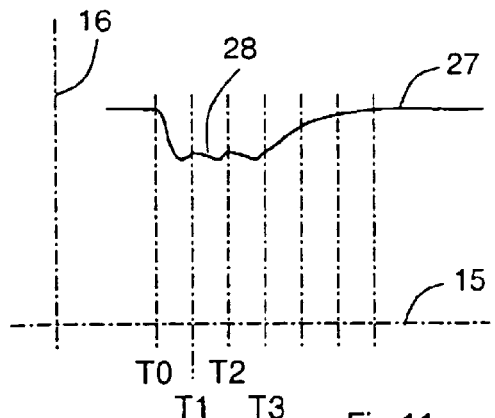
FIG. 11 shows a luminance response on a display screen of which the luminance rise time is longer than the luminance fall time, when a white point moves on the display screen during three consecutive frame periods (prior art)

FIG. 10 illustrates a white point 11 moving during a time interval T0–T3 of three frame periods from location 23 to location 26 over locations 24 and 25, within a screen area 14. FIG. 11 shows the luminance graph 27 in function of time, integrated over the area 14. A temporary lower luminance 28 occurs during the move of the white point. The luminance is temporarily faulty. This artefact is related to the image jump and further mentioned as a "temporary faulty luminance".

The "luminance jump" and "temporary faulty luminance" artefacts were explained hereinabove for simple moving images composed of one or more white points. These artefacts however occur more or less visible and/or measurable with any image moved on a display screen of an image device with different luminance rise and fall times. When an above mentioned specific image, for example the image illustrated by means of FIG. 1a, is moved over the screen whereby its content remains unchanged, depending on the speed of the movement, artefacts ranging from a luminance jump (or a brighter or darker luminance flash), over a large-area flicker to a large-area faulty luminance may occur. The artefacts occur only in the images or in parts of the image which are moved.

Figure 12:
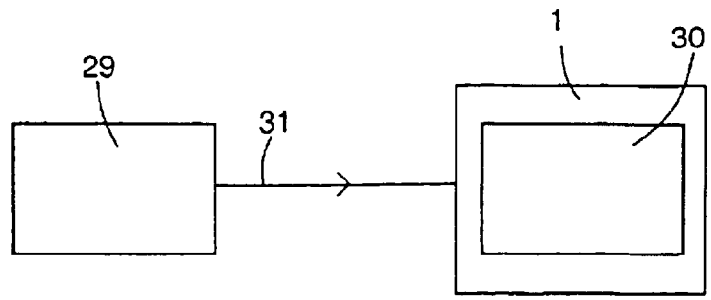
FIG. 12 shows a prior art connection of a video generator to an image display.

FIG. 12 shows a prior art connection 31 of a video generator 29 to an image display 1 which has a screen 30.

Figure 13:
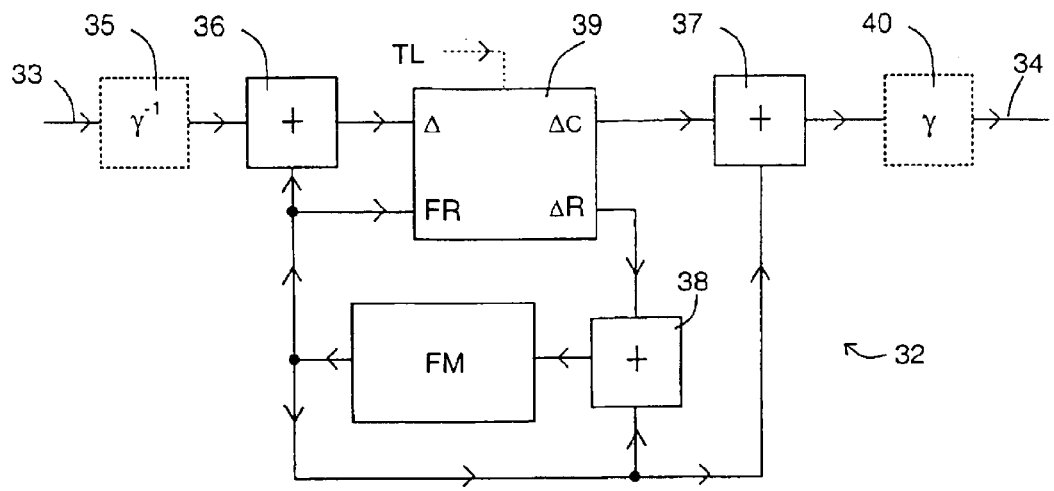
FIG. 13 is a block diagram of an embodiment of the present invention.

An embodiment of the present invention is explained by means of block diagram FIG. 13 and figures of waveforms. It is an apparatus in which a first video signal is converted into a second video signal.

FIG. 13 shows a block diagram of apparatus 32 (specifically, a video signal converter) according to the present invention. The input is a first video signal 33, and the output is a second video signal 34 which is a conversion of the first video signal 33. The apparatus 32 contains several functional blocks including an optional inverse gamma corrector 35, a subtractor 36, a first adder 37, a second adder 38, a processing block 39, a one-frame memory FM, and an optional gamma corrector 40. The functional blocks are interconnected through several interconnections for the interchange of values between the functional blocks. These values may correspond to luminances, or to gamma corrected video signals, or to video signals without gamma correction, or to a combination of one or more of these, depending on where the apparatus 32 is located in a video chain between a video generator and a display device. For the description of the apparatus 32, it is assumed that the values are linearly related to luminances on the display screen and that the first and second video signals are not gamma corrected. It will however be easy to extend the apparatus for gamma corrected video signals by the addition of an inverse gamma-correction 35 at the input side, and a gamma corrector 40 at the output side, or by integrating gamma awareness into the apparatus 32.

The processing block 39 has an optional input for values TL, these values being related to the present status of a picture element of the display screen such as temperature, location of the picture element being processed, differences in display behaviour between production batches, ageing of the display, intended to be used for compensations in the conversion of the first video signal into the second video signal. These values may come from a sensor in the display device, or be user-configurable through an on-screen display or an external data entry device.

Figure 14A:
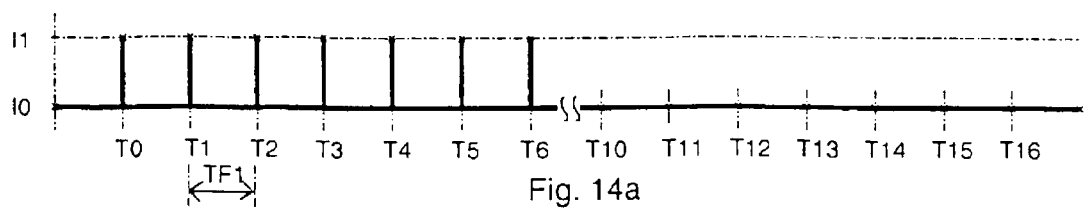
FIG. 14a shows a waveform of a first video signal corresponding to an image point which changes first from black to white and later from white to black.

For explaining the operation of the apparatus 32 of FIG. 13, reference is made to FIG. 14a which shows a chosen first video signal IN1. This chosen first video signal corresponds to a white picture element on a black background, the white picture element appearing at time T0 and disappearing at time T10. In FIG. 14a, the horizontal axis is a linear time scale with divisions TF1 corresponding to frame periods of the first video signal, and the vertical axis is a linear voltage scale. The first video signal amplitude changes at T0 from I0 to I1, and at T10 from I1 to I0.

FIG. 14b shows the waveform of the RMS drive voltage applied inside a typical LCD display device to the one or more liquid crystal image cells of the display screen of LCD display device which are driven to display the white point of the first video signal IN1, this being according to prior art.

Figure 15A:
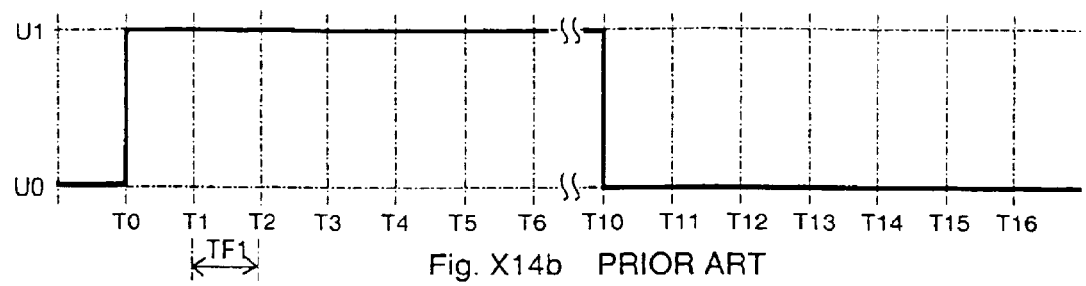
FIG. 15a shows the luminance response of a picture element on an LCD display screen of which the luminance rise time is shorter than the luminance fall time, according to the present invention and compared to prior art.
Figure 15A:
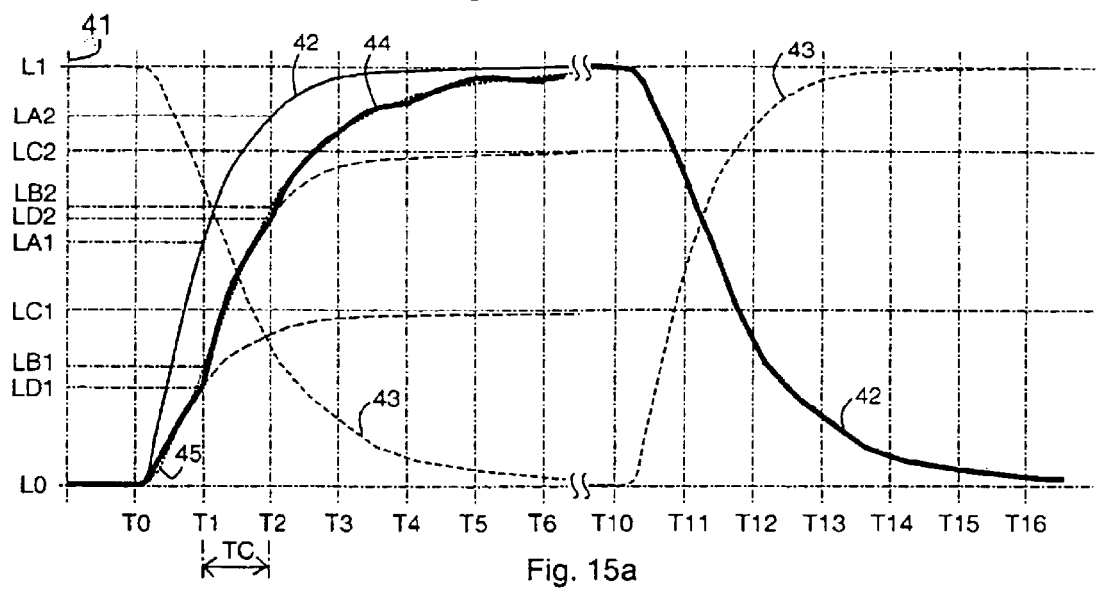

FIG. 15a shows a number of luminance time responses of a picture element on a display screen of an LCD display device of which the luminance rise time is shorter than the luminance fall time. The horizontal axis is a linear time scale, and the vertical axis 41 is a linear luminance scale. The luminance responses in FIG. 15a correspond to one unique LCD display device; the response is dependent on the display device, the location of the picture element on the display screen, and on the temperature.

Graph 42 on FIG. 15a shows the prior art luminance response to the first video signal IN1 at the location of the displayed picture element. As shown, the luminance rises from time instant T0 for a duration of several frame periods from L0 to L1, and falls from time instant T10 for a duration of several frame periods. The luminance rise time is shorter than the luminance fall time.

Graph 43 shows the prior art luminance response of the same picture element to a first video signal which is reversed in amplitude compared to video signal IN1 and which is further called –IN1. Luminance rise and fall times are as with Graph 42.

Video signals IN1 and –IN1 do not occur at the same instant for driving the same picture element, but may both be present at the input within a time interval shorter than an input frame period when e.g. a white picture element moves from one location to another within the image.

According to the present invention, the luminance rise and fall times are made equal, obtained by slowing down the faster response to match with the slower response, or accelerate the slower response to match with the faster response, or make the faster and the slower response equal to a predefined luminance response, the three methods being possible with the here described embodiment. Accelerating the slower response will however not always be useable in practice because higher drive voltages will be needed and saturation may occur in the image display.

The solution is only fully explained for making the faster response slower. Making the slower response faster, or making the faster response and the slower response equal to predefined responses, can easily be implemented by the skilled person.

In accordance with the present invention, graph 42 in FIG. 15a is slowed down to graph 44 during the time interval of rising luminance and matches as close as possible to graph 45 being the inverse of the falling graph 43. During the interval of falling luminance (from T10 on), the response should not be modified but should remain as in graph 42.

Figure 16:
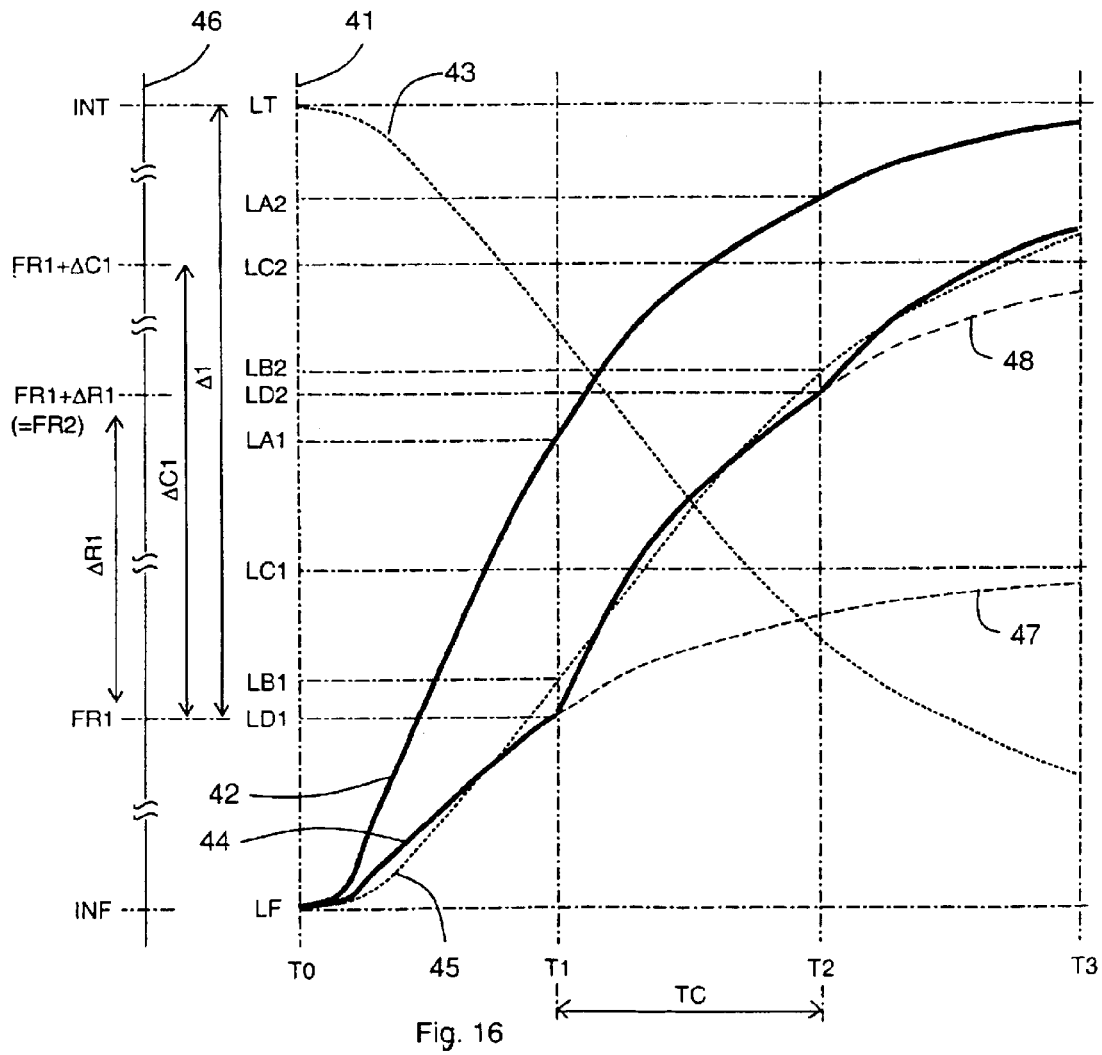
FIG. 16 shows how a luminance response is controlled according to the invention.

FIG. 16 is an enlarged version of a part of FIG. 15a, namely between time instances T0 and T3. To the first vertical axis 41 is added a second vertical axis 46 in order to show the relation between the second video signal and the luminance of the image on the display screen.

The method for converting or modifying the first video signal to develop the second video signal is further explained referring to the block diagram in FIG. 13.

The conversion is such that the second video signal is built up in real time in consecutive steps during corresponding consecutive correction periods TC. A correction period (TC) is by preference equal to the frame period of the displayed image. A correction period may be different from the frame period (TF1) of the first video signal.

From the present value of the first video signal 33 is subtracted in the subtractor 36 a value FR which corresponds to the present luminance as it was predicted one correction period before. The result is a value Δ. The value Δ determines how the luminance will have to change during the next correction period. Luminance should increase or rise when Δ is positive, decrease or fall when Δ is negative, and remain equal when Δ is zero. The value Δ is applied to a first input of the processing block 39. At a second input is applied the predicted present luminance FR. With input values Δ and FR and if present the input of one or more temperature values TL related to the connected display screen, two output values, ΔC and ΔR are determined. How these values ΔC and ΔR can be determined is explained further. ΔC is a correction value to be added to the predicted present luminance FR in order to reach a chosen luminance (to match to a chosen response) at the end of the next correction period. ΔR is the value with which the luminance will have changed after the next correction period when ΔC is added to the predicted present luminance FR taking into account the parameters of the display screen (of which some are screen-location, voltage and temperature dependent).

The value ΔC is added in the first adder block 37 to the predicted present luminance FR. The predicted present luminance FR was predicted at the beginning of the previous correction period and has been delayed over one correction period in a one-correction-period storage element or memory FM. The output of the first adder 37 is a value which 10 is the second video signal 34 without optional gamma correction.

The value ΔR is added in the second adder block 38 to the value of the predicted present luminance FR. The output is the predicted present luminance for a next correction period.

Although a correction to the second video signal takes several correction periods, a memory FM of only one correction period (or only one second video signal frame period) is needed. For each correction period a new correction value is determined based on the present luminance which was calculated at the start of the previous correction period and stored during one correction period.

The above described apparatus 32 contains all the above mentioned functional blocks and connections to change a luminance response in consecutive steps by converting the first video signal 33 to the second video signal 34. It is however not always needed to change the luminance response, namely when the luminance response already follows the slowest response with the first video signal; the apparatus can work transparently. This can be realized in the processing block 39.

For further explanation reference is made now to FIG. 16 which shows how the luminance response is built up during three consecutive correction periods from the time instances T0 to T3.

From T0 to T1, without correction, the luminance rise would follow graph 42 and increase from LF to LA1. According to the invention, the luminance response should however follow graph 45 and increase from LF to LB1. The shape of the rising luminance slope is however not exactly identical to the opposite of the shape of the falling luminance slope, and so it is difficult to match the rising luminance to the graph 45 and at the same time reach luminance LB1 at time instant T1. More important however is that the integrated luminance over the correction period from T0 to T1 is correct. Therefore, the luminance should raise so that the integrated luminance is the same as it would be if graph 45 were followed and LB1 reached at T1. This is so when the luminance follows the exponential graph 47, whereby the luminance is LD1 at T1. The corrected luminance response is marked as 44 on FIG. 16 (and FIG. 15a). As to FIG. 13 and its explanation, ΔC should have an appropriate value to correct the second video signal so that the luminance increases to LC1 over a number of correction periods; LD1 is the predicted present luminance FR at the end of the correction period T0–T1.

At T1, a following correction period T1–T2 starts. The luminance should continue to follow as closely as possible graph 45 and at the same time, the integrated luminance over T1–T2 should be substantially the same as if the luminance response did follow graph 45. Therefore, the luminance should rise (graph 48) to the luminance LC2 and rise from LD1 to LD2 within the correction period T1–T2. LD2 is the predicted present luminance after the correction T1–T2. If the video signal would not have been corrected, a luminance LA2 would have been reached at T2.

On the vertical axis 46 in FIG. 16 values are set out with reference to FIG. 13 and its explanation. The first video signal amplitude value goes from INF to INT at T0. At T1, the difference between the value of the first video signal and the predicted present luminance FR predicted at T0, is Δ1=INT–FR1. The output of the processing block is ΔC1 and is added to FR1 to be the new second video signal value. The predicted rise of luminance after the correction period T1–T2 is ΔR1, and the predicted present luminance at T2 is FR1+ΔR1=FR2. From T2 on, the luminance response is built up in the same way as described here before up to a luminance LT. FIG. 15a shows, that from T10, the luminance response follows the slower luminance falling response and no correction is carried out, the apparatus 32 working transparently.

Figure 15B:
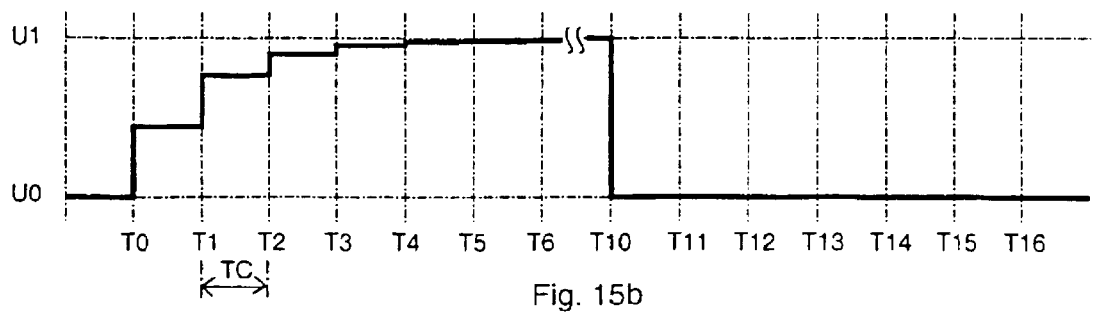
FIG. 15b shows a waveform according to the present invention of a RMS drive voltage to an individual crystal cell in an LCD display screen to let it change luminance first from black to white and later from white to black.

FIG. 15b shows the waveform of the RMS drive voltage with reference to FIG. 14b, but now in response to the second video signal.

Figure 15C:
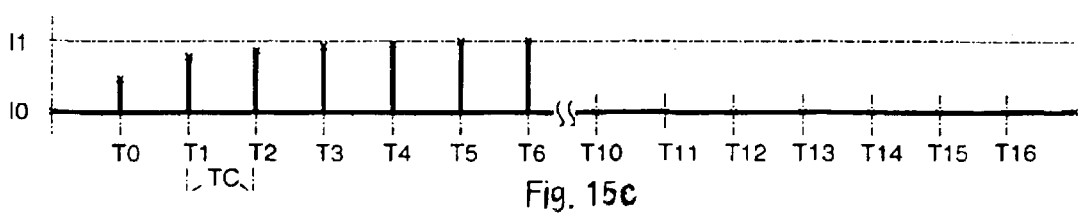
FIG. 15c shows a waveform according to the invention of a second video signal corresponding to a picture element which changes first from black to white and later from white to black.

FIG. 15c shows the second video signal, being the converted first video signal shown in FIG. 14a.

Figure 17A:
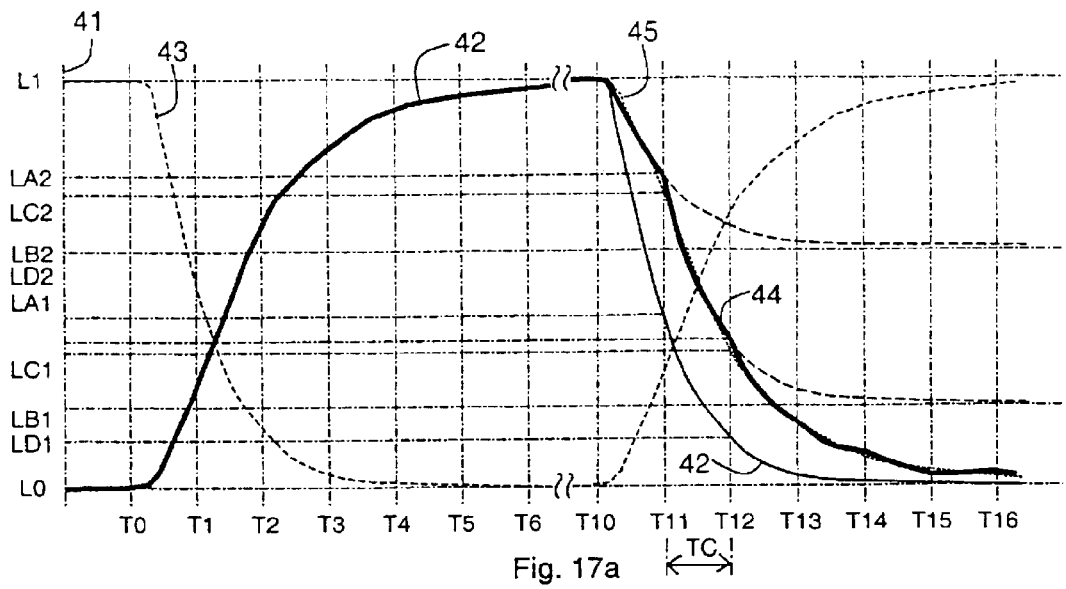
FIG. 17a shows the luminance response of a picture element on an LCD display screen of which the luminance rise time is longer than the luminance fall time, according to the present invention and compared to prior art.
Figure 17B:
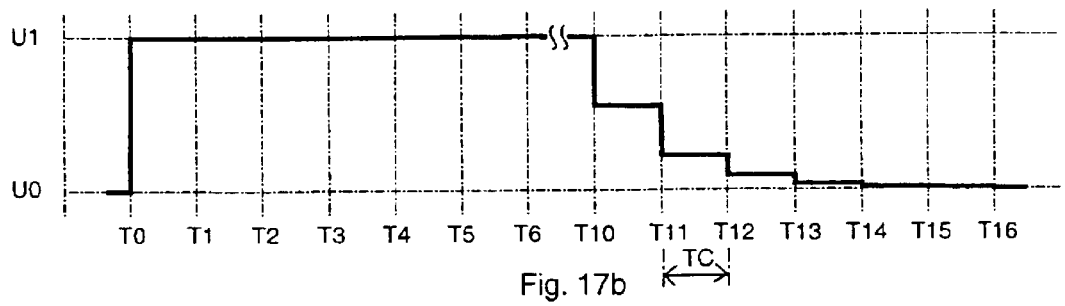
FIG. 17b shows a waveform according to the present invention of an RMS drive voltage to an individual crystal cell in an LCD display screen to let it change luminance first from black to white and later from white to black.
Figure 17C:
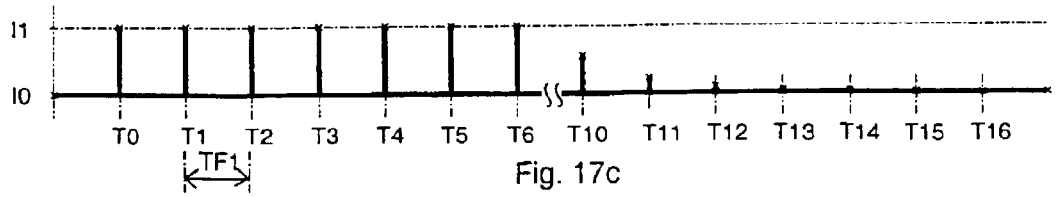
FIG. 17c shows a waveform according to the present invention of a second video signal corresponding to a picture element which changes first from black to white and later from white to black.

FIGS. 17a, 17b and 17c show similar waveforms compared to FIGS. 15a, 15b and 15c but for a display device of which the luminance rise time is longer than the luminance fall time. The luminance fall is now made slower from T10.

In the processing block 39 of FIG. 13, the output values ΔC and ΔR are determined as a function of the input values Δ and FR and optional temperature values and location values. The following C-language function is hereby used.

```
void calc_deltas(int delta_in, int from, int *delta out, int
    *delta_res)
{
float dout, dres;
if (delta_in > 0)   /* positive slope */
    /* no drive correction needed */
dout = delta_in;
}
    else            /* negative slope */
{ /* correction value */
    dout = (float)delta_in *
                ( (FRAME_PERIOD - tau-rising * (1 - exp(-
    FRAME_PERIOD/tau_rising)))
                / (FRAME_PERIOD - tau_falling * (1 - exp(-
    FRAME_PERIOD/tau_falling)))
                )
                * temp function(temperature, FALLING)
                * location_function(screen_x,screen_y);
}
```

-continued

```
/*
 * Predict pixel response. To be used in next frame iteration.
 * Always predict the slowest edge, since that is what we want
to
 * make the fastest one do as well.
 */
dres = (float)delta_in
            * (1 - exp(-FRAME_PERIOD/tau_rising))
            * temp_function(temperature, RISING)
            * location_function(screen_x,screen_y);

*delta_out = (int)rint(dout);
*delta_res = (int)rint(dres);
```

In the above shown C-language function, corrections are determined every 1/60 second (frame rate 60 Hz). It is written for the display of an image on a display device of which the luminance rise time is longer than the luminance fall time. Values "delta_out" (being ΔC) and "dres" (being ΔR) are calculated from "delta_in" (being Δ) and "from" (being FR). When "delta_in" is positive, the luminance should rise (called positive slope) and no correction is to be made. The calculation of dout (or ΔC) is based on the following equation wherein T is the correction period:

$$\Delta C = \Delta \cdot \frac{T - \tau_S \cdot \left(1 - e^{\frac{-T}{\tau_S}}\right)}{T - \tau_F \cdot \left(1 - e^{\frac{-T}{\tau_F}}\right)}$$

The calculation of "dres" (ΔR) is based on the following equation:

$$\Delta R = \Delta \cdot \left(1 - e^{\frac{-T}{\tau_S}}\right)$$

$\tau_S$ (or tau_rising) and $\tau_F$ (or tau_falling) are time constants of exponential functions corresponding to luminance time responses.

The C-program function includes a correction in function of temperature (temp_function) and location (location_function).

The processing block 39 may be implemented in different ways. It may be a pre-calculated look-up table with Δ and FR as input values, and ΔC and ΔR as output values which before being output are sent through multipliers for temperature and location dependent corrections.

It may be a hardware implementation of the C-program function shown above.

It may consist of a look-up table and a microprocessor to update the values in the look-up table in function of temperature.

Figure 18:
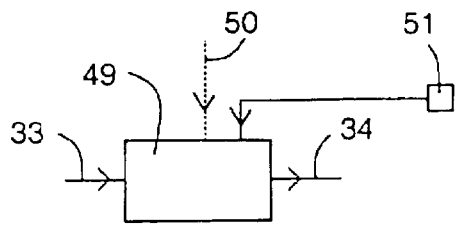
FIG. 18 shows a stand-alone apparatus according to the present invention.
Figure 19:
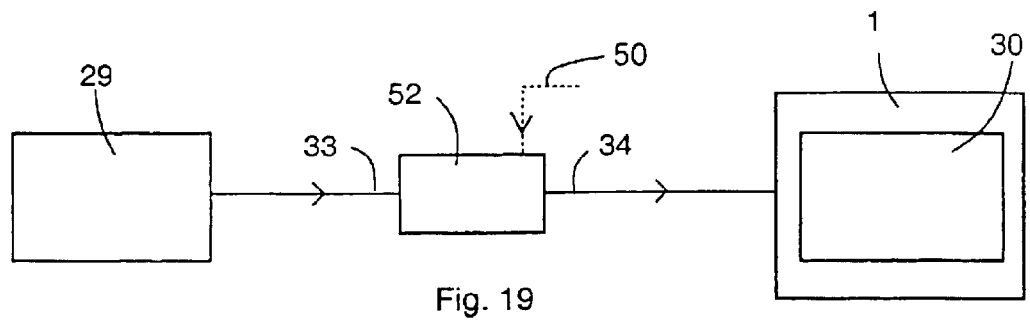
FIG. 19 shows an apparatus according to the present invention, connected between a video generator and an image display.
Figure 20:
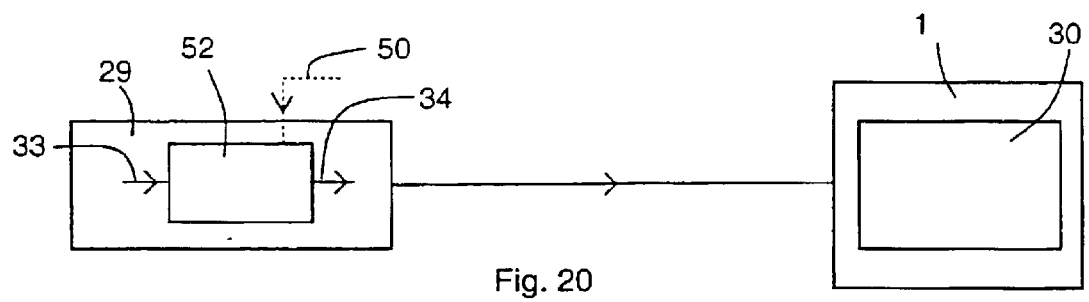
FIG. 20 shows a video generator with a built-in apparatus according to the present invention, which is connected to an image display.
Figure 21:
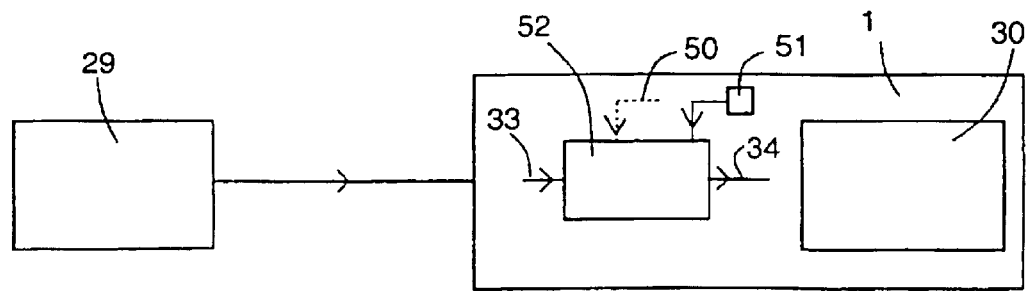
FIG. 21 shows a video generator which is connected to an image display which contains an apparatus according to the invention.

FIGS. 18, 19, 20 and 21 show other possible embodiments or applications of the present invention. FIG. 18 shows a stand-alone apparatus 49 which according to the present invention converts a first video signal 33 into a second video signal 34, having an optional input 50 for values (TL) related to a display screen and having an optional temperature sensor 51 for measuring a temperature of a display screen. According to the invention, FIG. 19 shows an apparatus 52 which corresponds to apparatus 32 of FIG. 13 and is connected between a video generator 29 and an image display 1. FIG. 20 shows according to the present invention an apparatus 52 built-in inside a signal generator 29 which is connected to an image display 1. FIG. 21 shows according to the present invention an apparatus 52 built-in inside an image display which is connected to a video generator 29.

It is also a possible application of the present invention that a video signal is generated or converted inside a signal generator so that the luminance time responses of a picture element of an image, displayed on a display device with different luminance rise and fall times, are equal for an amplitude change of the video signal and for the opposite amplitude change of the video signal.

What is claimed is:

1. A method for video signal conversion, said method comprising:
   receiving a first video signal; and
   producing a second video signal for display on a display device with different luminance rise and decay times, the display device comprising a display screen, and operating at a frame period,
   wherein said producing a second video signal includes changing at least one of a level and a duration of at least a portion of the first video signal such that the luminance response of a picture element of the display device to a change of the first video signal from a first amplitude value to a second amplitude value is substantially equal in shape, time, and amplitude but reversed in slope compared to the luminance response of a picture element of the display device to a change of the first video signal from the said second amplitude value to the said first amplitude value.

2. A method according to claim 1, whereby the said luminance responses are substantially equal in amplitude and not slower than the luminance response of the same or another picture element of the display device caused by the first video signal displayed without conversion.

3. A method according to claim 1, whereby the said luminance responses are substantially equal to predefined luminance responses.

4. A method according to claim 1, whereby the conversion of the first video signal into the second video signal is so that the second video signal is built up in consecutive steps during corresponding consecutive correction periods.

5. A method according to claim 4, whereby at the start of a correction period, for the determination of the next step, one or more of the following parameters are taken into account:
   the present luminance of the picture element as predicted at the instant of the previous correction period,
   the present amplitude of the first video signal,
   the physical location of the picture element on the display screen,
   the present temperature at the location of the picture element.

6. A method according to claim 4 wherein a correction period is equal to a multiple of the frame period of the first video signal.

7. A method according to claim 1, wherein the frame rate of the second video signal is different from the frame rate of the first video signal.

8. A method according to claim 1, wherein the conversion of the first video signal into the second video signal is so that the luminance response of a picture element of the display screen to a change of the first video signal is slowed down in order to match the luminance response in time and amplitude to the known slower luminance response of the same or another picture element of the display device for the opposite change of the first video signal.

9. A method according to claim 1, wherein the conversion of the first video signal to the second video signal is so that the luminance response of a picture element of the display screen to a change of the first video signal is accelerated in order to match the luminance response in time and amplitude to the known faster luminance response of the same or another picture element of the display device for the opposite change of the first video signal.

10. A method according to claim 2, Whereby the conversion of the first video signal into the second video signal is so that the second video signal is built up in consecutive steps during corresponding consecutive correction periods.

11. A method according to claim 3, whereby the conversion of the first video signal into the second video signal is so that the second video signal is built up in consecutive steps during corresponding consecutive correction periods.

12. Apparatus for converting a first video signal into a second video signal, the second video signal being for display on a display device comprising picture elements with difference luminance rise and decay times, the display device further comprising a display screen and operating at a frame period, comprising:

a device to convert the first video signal to the second video signal such that the second video signal causes the luminance response of a picture element of the display device to a change of the first video signal from a first amplitude value to a second amplitude value to have substantially the same amplitude/time characteristic but inverse in slope compared to the luminance response of the same or another picture element of the display device to a change of the first video signal from the said second amplitude value to the said first amplitude value.

13. Apparatus as in claim 12, further including a device which modifies the luminance response time of the picture element by stepwise formation of the second video signal.

14. The apparatus according to claim 12, whereby the said luminance responses are substantially equal to predefined luminance responses.

15. The apparatus according to claim 12, wherein the device is configured to build up the second video signal in consecutive steps during corresponding consecutive correction periods, and wherein at the start of a correction period, for the determination of the next step, one or more of the following parameters are taken into account:

the present luminance of the picture element as predicted at the instant of the previous correction period, the present amplitude of the first video signal, the physical location of the picture element on the display screen, the present temperature at the location of the picture element.

16. The apparatus according to claim 12, wherein the device is configured to build up the second video signal in consecutive steps during corresponding consecutive correction periods, each correction period being substantially equal to i times the frame period of the first video signal, where i is a positive nonzero integer.

17. The apparatus according to claim 12, wherein the frame rate of the second video signal is different from the frame rate of the first video signal.

18. The apparatus according to claim 12, wherein the device is configured to convert the first video signal into the second video signal so that the luminance response of a picture element of the display screen to a change of the first video signal is slowed down in order to match the luminance response in time and amplitude to the known slower luminance response of the same or another picture element of the display device for the opposite change of the first video signal.

19. The apparatus according to claim 12, wherein the device is configured to convert the first video signal to the second video signal so that the luminance response of a picture element of the display screen to a change of the first video signal is accelerated in order to match the luminance response in time and amplitude to the known faster luminance response of the same or another picture element of the display device for the opposite change of the first video signal.

20. The apparatus according to claim 12, wherein said device modifies the luminance response time of the picture element by stepwise formation of the second video signal.

* * * * *